United States Patent [19]
Gray

[11] 3,814,045

[45] June 4, 1974

[54] AMPHIBIOUS VEHICLES

[76] Inventor: Robert Gray, Nouale Cottage, Nouale Ln., Hightown, near Ringwood, England

[22] Filed: July 19, 1971

[21] Appl. No.: 163,808

[52] U.S. Cl. ................. 115/1 R, 9/1 T, 115/19, 115/63, 305/39
[51] Int. Cl. ................................. B60f 3/00
[58] Field of Search ........ 115/1 R, 19, 63; 180/9.2, 180/9.2 R; 305/39, 50, 52, 56, 57, 58; 9/1 T; 416/7, 84, 85

[56] References Cited
UNITED STATES PATENTS

| | | | |
|---|---|---|---|
| 424,076 | 3/1890 | Pond | 115/63 |
| 1,455,906 | 5/1923 | Cox | 305/57 |
| 1,928,511 | 9/1933 | St. Martin | 115/19 X |
| 3,154,351 | 10/1964 | Tucker, Sr. | 305/50 X |
| 3,313,263 | 4/1967 | Ferguson | 115/1 R |
| 3,427,078 | 2/1969 | Parsons | 115/1 R |

*Primary Examiner*—Lloyd L. King
*Assistant Examiner*—Randolph A. Reese
*Attorney, Agent, or Firm*—Wolfe, Hubbard, Leydig, Voit & Osann, Ltd.

[57] ABSTRACT

The invention relates to an amphibious vehicle for the transport of passengers and/or cargo over land, soft mud or water. The vehicle is supported and propelled by two or more tracks in the form of endless belts each of which comprises a series of inter-linked open ended boxes and which are trained about wheels or sprockets, driven by a suitable engine. Steering of the vehicle is effected by retarding one of the belts with respect to the other.

4 Claims, 16 Drawing Figures

INVENTOR
ROBERT GRAY

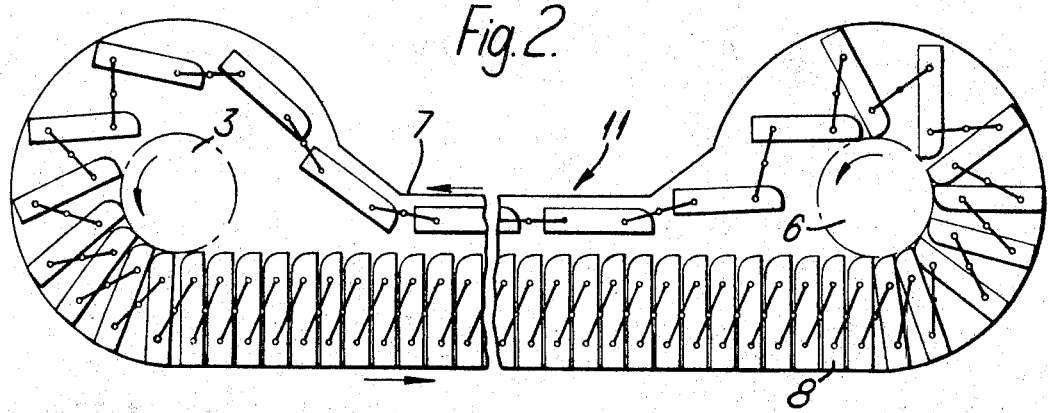
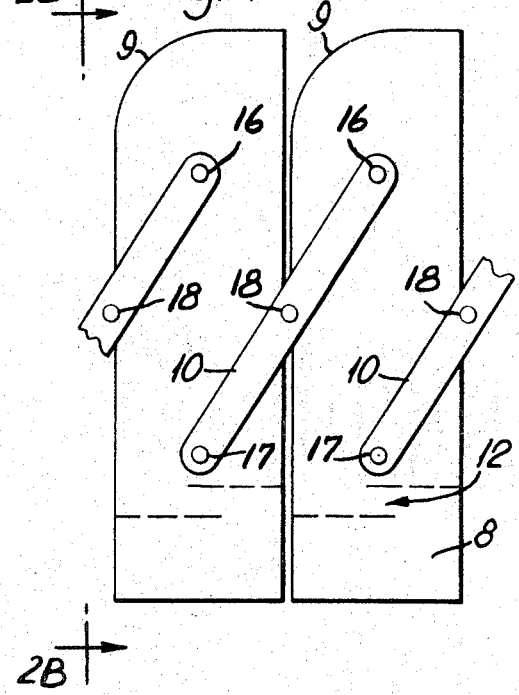
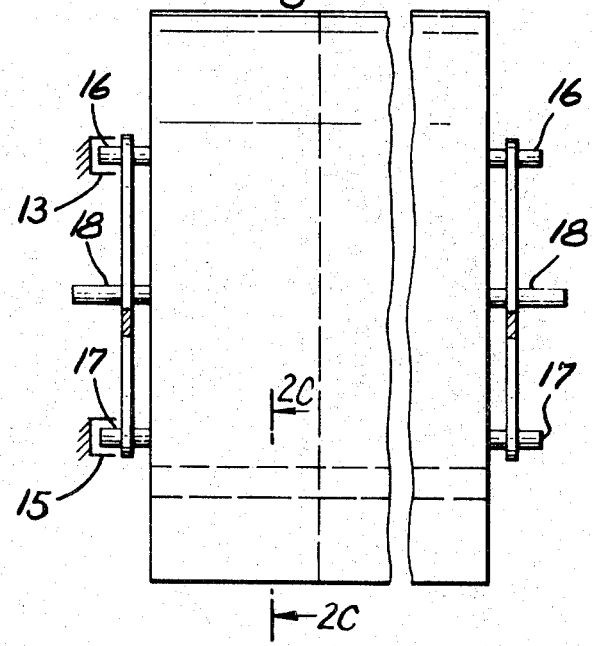
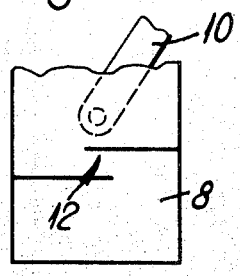

Fig. 3.
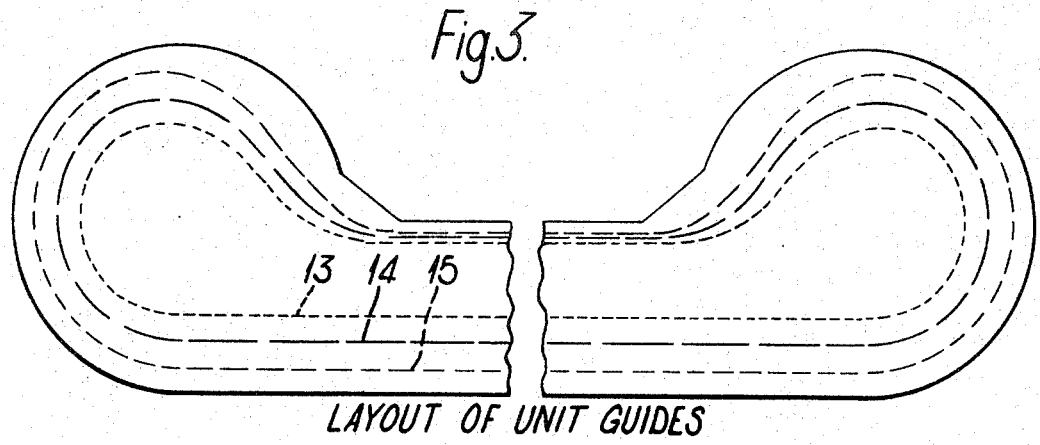
LAYOUT OF UNIT GUIDES
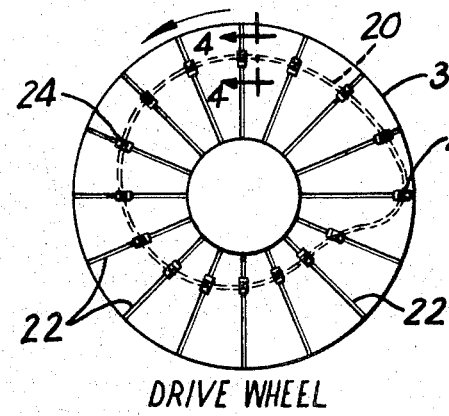
Fig. 3A.
DRIVE WHEEL
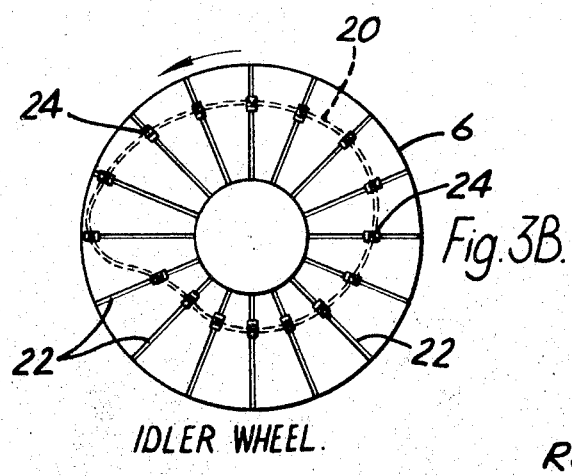
Fig. 3B.
IDLER WHEEL.
INVENTOR
ROBERT GRAY

INVENTOR
ROBERT GRAY

AMPHIBIOUS VEHICLES

DESCRIPTION OF THE INVENTION

The invention relates to amphibious vehicles, and in particular to vehicles for transporting cargo or passengers over open land, mud or water without modification. The vehicle is equally suitable for transporting high bulk/low density cargos or awkward and heavy loads for the construction industry or road vehicles of all types. The vehicle contains its own power unit, crews quarters and control platform or bridge.

An object of using amphibious vehicles constructed in accordance with the invention is that normal port facilities such as wharfs, craneage, lighterage and tugs would not be essential for loading and discharging the vehicles, as they could climb up any shelving beach and load and discharge themselves directly into or from road or rail transport. This would cut out or reduce harbor dues, demurrage and lighterage fees.

A further advantage is that each amphibious vehicle could be used by itself as a coastal vessel with its cargo being loaded nearest the factory of origin and discharged at the point nearest its final destination, hence saving on land transport costs.

Other objects and advantages of the invention will become apparent upon reading the following detailed description and upon reference to the drawings, in which:

FIG. 2 is a side elevational view showing generally a series of buoyancy boxes trained about a pair of sprocket wheels and forming an endless belt;

FIG. 2A is an enlarged fragmentary elevational view of a portion of the endless belt shown in FIG. 2;

FIG. 2B is an enlarged side elevational view taken substantially in the plane of line 2B—2B in FIG. 2A;

FIG. 2C is a side elevational view taken substantially along the plane of line 2C-2C in FIG. 2B;

FIG. 3 is an illustrative diagram showing generally in elevation the placement of the endless guide used in supporting the buoyancy boxes of the endless belt;

FIGS. 3A and 3B are side elevational views showing the respective relationships between the sprocket wheels and the respective accelerating and decelerating cams;

While the invention is described in connection with an illustrated embodiment, it will be understood that it is not intended to limit the invention to that embodiment. On the contrary, it is intended to cover all alternatives, modifications and equivalents as may be included within the spirit and scope of the invention as is defined by the appended claims.

Figure 1:
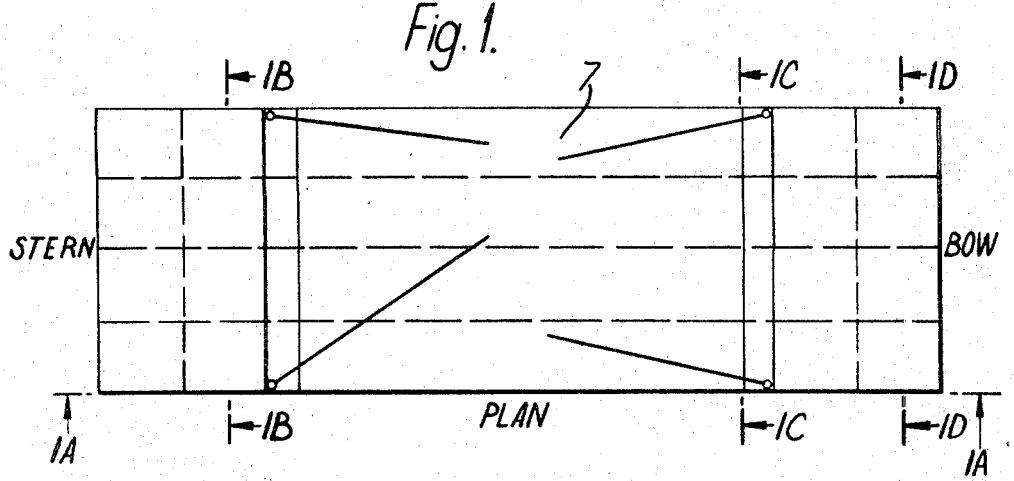
FIG. 1 is a top plan view of an amphibious vehicle constructed in accordance with the present invention.
Figure 1A:
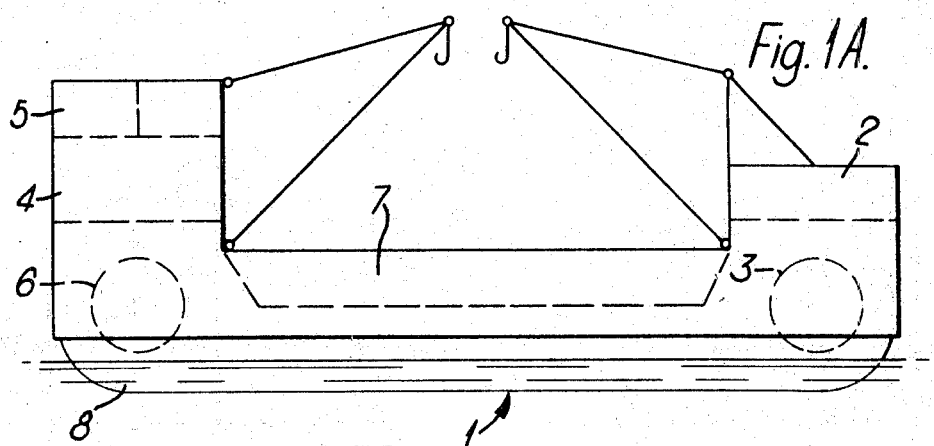
FIG. 1A is a side elevational view of the amphibious vehicle shown in FIG. 1.
Figure 1B:
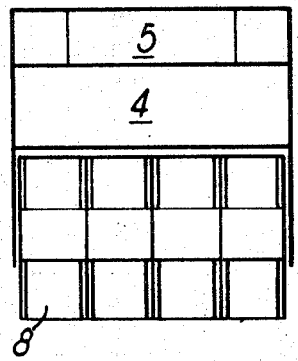
FIGS. 1B to 1D are plan elevational views respectively taken along the lines 1B—1B, 1C—1C, and 1D—1D in FIG. 1.
Figure 1C:
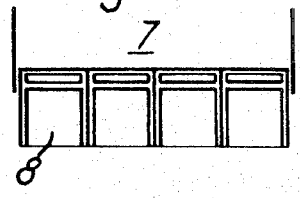
Figure 1D:
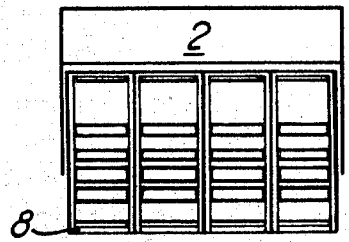

Referring to the drawings, the general arrangement of a vehicle constructed in accordance with the invention is shown in FIG. 1. The engine room 2 is situated over the bow driving sprocket 3, while the crews quarters 4 and the bridge 5 are located over the return sprocket 6. This arrangement tends to equalize the fore and aft loading. The central cargo deck well 7 is located between the bow and stern structures. In FIGS. 1B, 1C and 1D the locations and relative positions of the belts of buoyancy boxes 8 traveling below the cargo deck are shown.

In accordance with the invention, there is provided an amphibious vehicle 1 supported and propelled on either water or land by a buoyant hull, located below the deck or platform of the vehicle, consisting of two or more tracks which rotate around two main sprockets 3 and 6 in the form of endless belts. Each track comprises a plurality of hollow compartments 8 joined together by pin jointed links 10, to form the endless belts which are aligned with the fore and aft direction of the deck section. In the illustrated embodiment, the complete vehicle is supported by a series of such belts which are aligned in parallel to extend over the entire plan area of the vehicle.

Propulsion of the vehicle is effected by transferring the power of the engine (not shown) via the drive sprocket 3 to move the series of hull buoyancy units through the water in a fore and aft direction in relation to the platform—the returning units being pulled over the sprocket 6 and under the deck of the vehicle 1 towards the driving sprocket 3.

The hull buoyance units consist of identical rectangular box sections 8, each of which is open on its bottom face. The interior of the box can be rectangular or preferably tapered inwards towards the closed top of the box. This taper could be in the form of the frustrum of a pyramid or a cone. Buoyancy of these boxes 8 is maintained by trapping air inside each box as it is dragged, in turn, below the surfaces of the mud or water. On relatively hard ground, the vehicle is supported by resting on the respective edges of the vertical walls of the upturned box sections 8.

By mounting the drive and return sprockets 3 and 6, which are of relatively large diameter, at the bow and stern of the platform, each box 8 in the endless belt of open bottom boxes is guided below the surface of the water at an angle, with the trailing wall edge of the box section being immersed last. Due to the curvature of the drive wheel 3, the angle of entry of each box 8 will increase with the load applied to the platform as the tangent to the wheel at the water line moves radially around the drive wheel until the whole vessel displaces an equalizing mass of water. As each box section 8 is dragged below the surface of the water at an angle, a certain amount of water enters the box until the trailing edge of the box is immersed and the air remaining in the box is trapped. The amount of water admitted in this way increases slightly as the load or displacement increases, but the volume of water admitted to each box 8 is always less than the increase in displacement required for maintaining the stability of the vessel 1. The vehicle 1 is thus propelled on either mud or water by the reaction of the water trapped in these boxes 8 as they are dragged along the length of the vehicle, together with the skin friction of the water acting on the external side walls of each box. In connection herewith, it should be noted that each box section 8 has one of its upper edges 9 rounded to facilitate rotation about the respective sprocket wheels 3 and 6.

The vehicle 1 is steered both on land and sea by varying the respective travel speed between the port and starboard series of belts. This can be achieved by attaching either torque convertors (not shown) or variable drives (not shown) to the power unit.

To decrease the amount of headroom required for simultaneously passing the driving portion of the belt of boxes 8 and the returning portion of the belt of boxes 8 below the deck, the rectangular buoyancy units have been designed with relatively small end sections, and each of the rectangular box sections is rotated 90° about its horizontal axis as it passes under the deck on its return path. This design restriction in the cross-sectional area of the open end of each box also limits the amount of water able to enter any one box as it is being angularly immersed into the water.

The method of joining the box sections together to form a belt, and the method of supporting the loaded vehicle 1 on the series of belts is by means of pin jointed links 10 fixed in pairs between successive boxes 8. The respective links 10 are fitted to pin joints which are attached to the vertical side walls of each box. In this manner, one link 10 joins the bottom of a box 8 with the top of the next adjacent box in one direction while a second link 10 joins the top of the box 8 with the bottom of the next adjacent box in the other direction. Each box 8 in the belt has a spaced pair of pin joints on either side face, one above the other at about quarter points on the overall depth of the box. By rotating the links 10 about the pin joints, the series of boxes 8 can be lined up vertically with the links 10 in a diagonal position between adjacent boxes 8 for propulsion, or the same series of boxes can be extended horizontally outwards during their return motion with the links 10 rotated to form an extended chain of horizontal boxes 8, resembling a roller chain.

While the horizontally positioned boxes 11 contribute intermittant buoyancy due to wave action below the cargo deck, these boxes are prevented from flooding as they move forward by an airlock 12, fitting in each box 8 as shown in FIG. 2C. This airlock 12 functions only when the boxes are horizontally positioned since the intake of water into vertically positioned boxes 8 depends only on the angle of contact at which a given box 8 enters the water.

To support the vehicle 1 on the belt of vertical box sections 8, guide pins 16, 17 and 18 are fitted to the external side faces of each diagonal link 10 with the main guide pin 18 being at the midpoint of each link 10 and with auxiliary guide pins 16 and 17 being fitted near the respective ends of each link so as to serve as extension shafts to the pin joints which are fitted to the respective boxes 8.

Referring to FIG. 3, separate guide rails in the form of endless tracks 13, 14 and 15 are provided for supporting the buoyancy boxes 8 through the respective guide pins 16, 18 and 17 as the endless belt is driven beneath the vehicle 1. Accordingly, each guide pin 16, 17 and 18 is engaged for movement in its own track with the weight of the vehicle 1 being transferred to the respective buoyancy boxes 8 through the center track 14 via the center guide pins 18 on each diagonal link 10. At the same time, the top and bottom guide pins 16 and 17 on each link 10 travel in separate endless tracks 13 and 15 which are positioned substantially in parallel to and equidistant from the load carrying track 14 in the areas of the upper and lower runs and which converge varied but equal distances from the track 14 to conform to predetermined curves as tracks 13, 14 and 15 bend about the sprocket wheels 3 and 6. These outer tracks 13, 15 enable the alignment of the boxes 8 to be maintained in a vertical position.

The central-guide pin 18 on each link 10 controls the movement of the belt as it passes around the sprockets 3 and 6 at the respective ends of the horizontal track. By varying the radii of the outer tracks 13 and 15 in which the outer guide pins 16 and 17 move around the sprockets 3 and 6, each of the respective boxes 8 can be freely rotated about its center guide pin 18 so that all of the boxes 8 and associated guide pins 16, 17 and 18 are substantially horizontally aligned in adjacent parallel tracks so as to form an extended chain 11 during the return trip of the belt below the deck of the vehicle 1, as discussed above.

Due to the rapid changes in the length of the belt individual boxes 8 rotate between a vertical and a horizontal alignment, the horizontally positioned boxes in the endless chain will be traveling at a far greater belt speed than the vertically positioned boxes. For this reason, it is necessary for the central guide pins 18 on each pair of links 10 to ride an accelerating cam as they pass upwards from the vertical to the horizontal position around the rear sprocket, and a decelerating cam as they return downwards around the leading sprocket. Accordingly, a large stationary cam 20 is mounted in spaced, parallel relationship with each of the sprocket wheels 3, 6, and a plurality of equidistantly spaced radial slots 22 are provided about the circumference of each of the respective sprocket wheels 3, 6. A traveler 24, having a slotted groove 26 on one surface thereof, for receiving a guide pin 18, and a cam follower in the form of a projecting finger 28 on the other surface thereof is slidably mounted in each of the radial slots 22 and positioned therein so that the projecting finger 28 rides the peripheral face of the associated stationary cam 20.

Each of the cams 20 is sized and shaped so that the respective travelers 24 moves radially inward and outward under the direction of the cam follower 28 as the respective sprocket wheel 3 or 6 rotates about its axle. Thus while the angular velocity of the sprocket wheel is maintained constant, the distance through which the traveler 24 rotates varies as the cam follower 28 rides the face of the stationary cam 20. In this way, the linear speed of the traveler is matched to the change of velocity required to expand and contract the length of the endless belt as the individual boxes 8 change between a vertical and a horizontal alignment, and maintains rotary power to the series of center guide pins 18 about the driving sprocket 3.

As the series of successive travelers 24 are carried about the face of the cam 20, successive guide pins 18 engage and disengage with the grooved slots 26 located therein so as to impart a maximum belt velocity to the horizontally extended section of the belt while imparting a minimum belt velocity to the closely butted group of vertically aligned boxes 8. It should be noted that these positions of maximum and minimum velocity are respectively at the top and bottom of each sprocket wheel. It should further be noted, that the ratio between the maximum and minimum distance of travel between the extended and the closely butted groups of buoyancy boxes is proportional to the maximum and minimum radii of the stationary cam 20.

Figure 4:
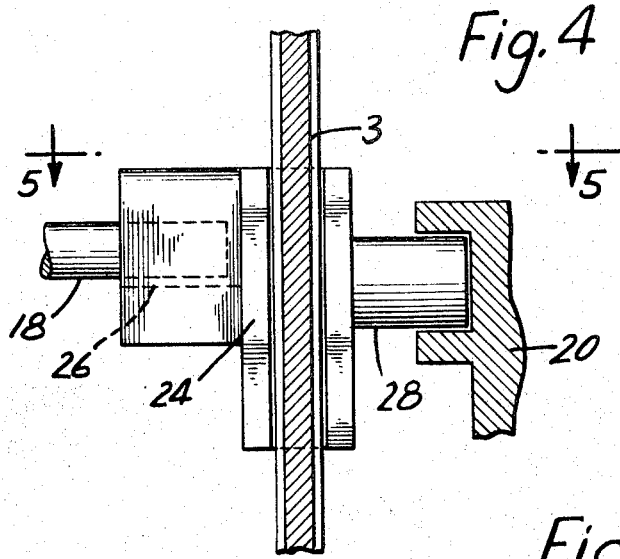
FIG. 4 is an enlarged fragmentary end view partially in section, taken substantially in the plane of line 4—4 in FIG. 3A.
Figure 5:
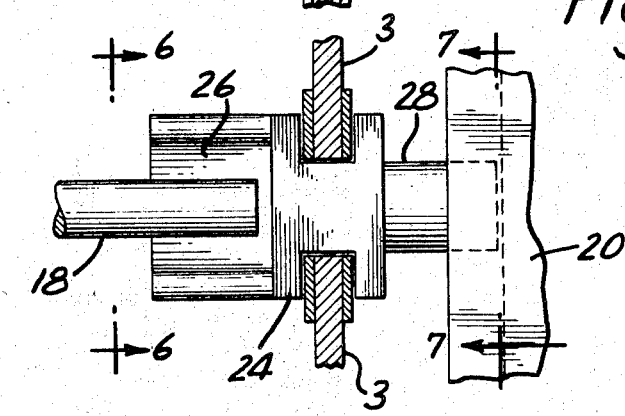
FIG. 5 is an enlarged fragmentary plan view, partially in section, taken substantially in the plane of line 5—5 in FIG. 4.
Figure 6:
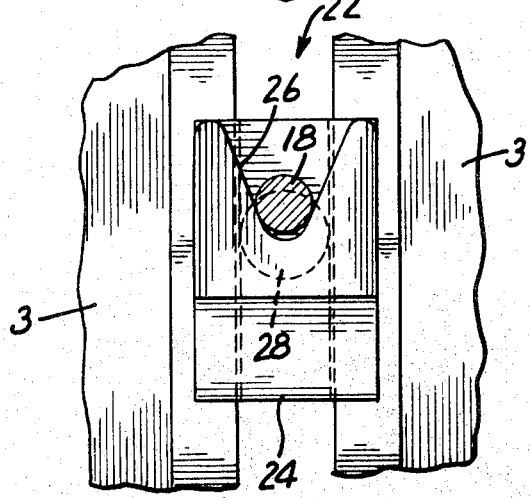
FIG. 6 is an enlarged fragmentary elevational view taken substantially in the plane of line 6—6 in FIG. 5.
Figure 7:
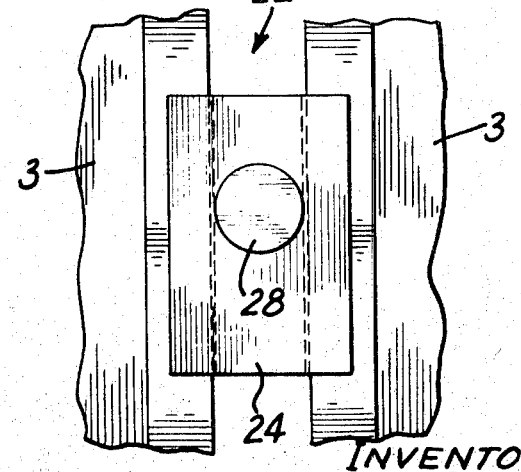
FIG. 7 is an enlarged fragmentary elevational view taken substantially in the plane of line 7—7 in FIG. 5.

More specifically, reference being had to FIGS. 4-6, the rotating drive sprocket wheel 3 extends the chain of returning boxes 8 in the upper run, as the pin 18, associated with each succeeding box, is drawn into the slotted groove 26 of an orbiting traveller 24. By aligning the central track 14 with the periphery of the cam 20 and by increasing the perpendicular distance of the tracks 13 and 15 from the track 14 as it curves about the drive sprocket wheel 3, each box is caused to rotate about its associated pin 18 as it moves about sprocket wheel 3 under the action of the pins 16 and 17, such that the pin 18 is ejected from the slotted groove 26 of the respective orbiting traveller 24 at the point at the bottom of the orbital curve where the auxiliary pins 16 and 17 and their associated tracks 13 and 15 are spaced a maximum distance from, but parallel to, the central guide track 14.

In this manner a series of linked vertically packed boxes are pushed onto tracks 13, 14 and 15 from the drive sprocket wheel 3 in a close-packed chain, causing the drive sprocket wheel 3 and the vehicle to move forward over this ever increasing chain of close-nested boxes.

At the same time as the boxes are loaded onto the lower run, the chain of horizontally extended boxes on the upper run are being drawn forwards in relation to the vehicle by the engagement of the center pins 18 in the slotted grooves 26 of successive travellers 24 on the rotating drive sprocket 3. This traction motion causes the idling sprocket wheel 6 to rotate. As the idler wheel 6 rotates in sympathy with the drive sprocket wheel 3, the orbiting travellers 24 located thereon also engage in sequence the guide pins 18 of the boxes 8 in the close-packed chain of boxes moving in the lower run. As the traveller 24 follows the cam follower 28 about the stationary cam 20, the perpendicular distance from the center track 14 to the guide tracks 13 and 15 continually decreases, causing the respective boxes to rotate about the pins 18 such that the boxes are fully extended in a horizontal position when the guide pin 18 escapes the slotted groove 26 of the traveller 24 at the top of the orbital curve.

It should be noted herein that by offsetting the orbital pins 16 and 17 slightly from and on opposite sides of the center line of each link and by closely positioning the parallel guide tracks 13, 14 and 15 in the upper run, the horizontally extended boxes 8 and the associated links 10 are made to form a substantially straight line when under tension.

To reverse the direction of movement of the belt, the direction in which the sprocket drive wheel 3 rotates and the direction in which the sprocket idler wheel 6 rotates should be reversed. This has the effect of removing the drive load from the drive wheel 3 positioned in the bow and imparting it to the idler wheel 6 positioned in a reverse direction thus causing the buoyancy boxes 8, which comprise the endless belt, to be pushed from stern to bow rather than from bow to stern.

The power required to rotate either wheel 3 or 6 is envisioned as being a series of small d.c. electric traction motors, axially mounted on each of the independent shafts of the respective drive and idler wheels 3, 6 for controlling a given belt. The generator would be a gas/diesel generator and the respective motors would be controlled by cables from the bridge 5.

I claim as my invention:

1. In an amphibious vehicle the combination comprising a pair of wheels horizontally spaced from one another and at least one of which has associated driving means, an endless belt trained about the wheels, the endless belt being formed of flat, open bottomed rectangular boxes occupying a lower run and an upper run, each open bottomed rectangular box having its open face presented to the water and being enclosed about its upper face for trapping air therein and to provide transverse edges for engaging the water for forward propulsion, the respective boxes forming the endless belt being interconnected by a series of swivel links connected to pins projecting from the boxes and engaged in an associated set of endless tracks, variably spaced for insuring a desired orientation of each box at each point along its path of travel so that the boxes in the lower run occupy a closely nested, vertically edgewise position to provide maximum floatation while the boxes in the upper run occupy a horizontal end-to-end position to permit return movement of the boxes within a restricted overhead space.

2. The combination as claimed in claim 1 in which means are provided for guiding the boxes so that the open bottom of each box is brought into engagement with the surface of the water at an angle, said angle being relatively small when light loads are applied to the vehicle and increasingly larger as increasing loads are applied.

3. In an amphibious vehicle the combination comprising a pair of wheels horizontally spaced from one another and at least one of which has associated driving means, an endless belt trained about the wheels, the endless belt being formed of flat, open bottomed rectangular boxes occupying a lower run and an upper run, each open bottomed rectangular box having its open face presented to the water and being enclosed about its upper face for trapping air therein and to provide transverse vertical edges for engaging the water for forward propulsion; means associated with each of said boxes, in the form of an air lock located near the lower end of the box and spaced upwardly from the lower edges thereof, for preventing said boxes from accidentally flooding when aligned in said horizontal end-to-end position; and means associated with said boxes for operatively connecting the endless belt to said vehicle for movement about said wheels.

4. In an amphibious vehicle the combination comprising a pair of wheels horizontally spaced from one another and at least one of which has associated driving means, an endless belt trained about the wheels, the endless belt being formed of flat, open bottomed rectangular boxes occupying a lower run and an upper run, each open bottomed rectangular box having its open face presented to the water and being enclosed about its upper face for trapping air therein and to provide transverse edges for engaging the water for forward propulsion, and guide means, including a series of swivel links interconnecting the respective boxes which form the endless belt by connecting pins projecting from the side thereof, for aligning the boxes in the lower run in a closely nested, vertically edgewise position to provide maximum floatation and for aligning the boxes in the upper run in a horizontal end-to-end position to permit return movement of the boxes within a restricted overhead space.

* * * * *